US010942311B2

(12) United States Patent
Fujita

(10) Patent No.: US 10,942,311 B2
(45) Date of Patent: *Mar. 9, 2021

(54) OPTICAL DEVICE

(71) Applicant: Fujikura Ltd., Tokyo (JP)

(72) Inventor: Tomoyuki Fujita, Sakura (JP)

(73) Assignee: FUJIKURA LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/812,547

(22) Filed: Mar. 9, 2020

(65) Prior Publication Data
US 2020/0209478 A1 Jul. 2, 2020

Related U.S. Application Data

(63) Continuation of application No. 16/306,953, filed as application No. PCT/JP2017/008702 on Mar. 6, 2017, now Pat. No. 10,627,573.

(30) Foreign Application Priority Data

Jun. 6, 2016 (JP) .............................. JP2016-112871

(51) Int. Cl.
G02B 6/26 (2006.01)
G02B 6/04 (2006.01)
(Continued)

(52) U.S. Cl.
CPC ............. *G02B 6/262* (2013.01); *G02B 6/028* (2013.01); *G02B 6/04* (2013.01); *G02B 6/26* (2013.01);
(Continued)

(58) Field of Classification Search
CPC .......... G02B 6/262; G02B 6/028; G02B 6/04; G02B 6/26; G02B 6/28; G02B 6/287;
(Continued)

(56) References Cited

U.S. PATENT DOCUMENTS 5,030,321 A 7/1991 Coutandin et al.
7,991,255 B2* 8/2011 Salokatve ............ G02B 6/2835
385/43
(Continued)

FOREIGN PATENT DOCUMENTS

CN 1048104 A 12/1990
JP 2-58006 A 2/1990
(Continued)

OTHER PUBLICATIONS

Notice of Allowance dated Oct. 23, 2018, issued in counterpart Japanese Patent Application No. 2016-112871 (2 pages).
(Continued)

Primary Examiner — Michael P Mooney
(74) Attorney, Agent, or Firm — Westerman, Hattori, Daniels & Adrian, LLP

(57) ABSTRACT

Provided is an optical device which can control a beam quality of outgoing light. An optical device (10) includes an entrance fiber bundle (12), an exit fiber (13), and a reduced diameter part (11). The reduced diameter part (11) has (i) an entrance end surface (11a) and (ii) an exit end surface (11b) which is narrower in area than the entrance end surface (11a). In a case where the entrance end surface (11a) is viewed from a normal direction of the entrance end surface (11a), a center (C2) of the exit end surface (11b) deviates from a center (C1) of the entrance end surface (11a).

3 Claims, 7 Drawing Sheets

Figure 1:
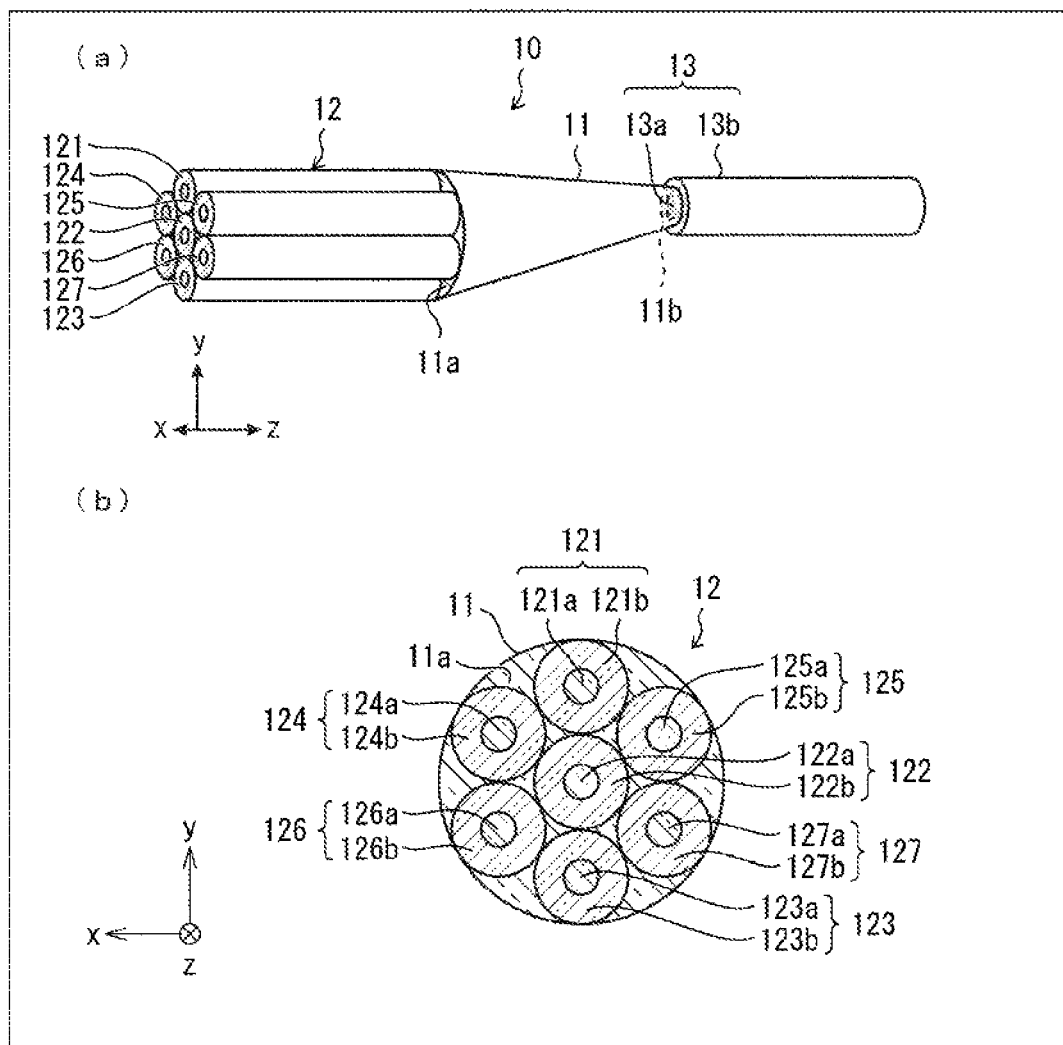

(51) Int. Cl.
*G02B 6/42* (2006.01)
*G02B 6/287* (2006.01)
*G02B 6/028* (2006.01)
*G02B 6/28* (2006.01)
*H01S 3/067* (2006.01)
*H01S 3/094* (2006.01)
*H01S 3/0941* (2006.01)
*H01S 3/23* (2006.01)

(52) U.S. Cl.
CPC .............. *G02B 6/28* (2013.01); *G02B 6/287* (2013.01); *G02B 6/42* (2013.01); *G02B 6/4202* (2013.01); *H01S 3/067* (2013.01); *H01S 3/0675* (2013.01); *H01S 3/09415* (2013.01); *H01S 3/094003* (2013.01); *H01S 3/2383* (2013.01)

(58) Field of Classification Search
CPC ......... G02B 6/42; G02B 6/4202; H01S 3/067; H01S 3/0675; H01S 3/094003; H01S 3/09415; H01S 3/2383
USPC ........................ 385/31, 43, 96, 127
See application file for complete search history.

(56) References Cited

U.S. PATENT DOCUMENTS

| 10,627,573 | B2* | 4/2020 | Fujita ................. G02B 6/42 |
|---|---|---|---|
| 2009/0110008 | A1 | 4/2009 | Dong et al. |
| 2014/0205236 | A1 | 7/2014 | Noguchi et al. |
| 2015/0293306 | A1 | 10/2015 | Huber et al. |
| 2016/0077284 | A1 | 3/2016 | Arao et al. |
| 2017/0235055 | A1 | 8/2017 | Fujita et al. |

FOREIGN PATENT DOCUMENTS

| JP | 3-27006 A | 2/1991 |
|---|---|---|
| JP | 2011-232636 A | 11/2011 |
| JP | 2013-142792 A | 7/2013 |
| JP | 2013-190714 A | 9/2013 |
| JP | 2016-57540 A | 4/2016 |
| JP | 2016-80914 A | 5/2016 |

OTHER PUBLICATIONS

Notification of Reasons for Refusal dated Jun. 5, 2018, issued in counterpart Japanese Patent Application No. 2016-112871 (2 pages).
Notification of Reasons for Refusal dated Nov. 21, 2017, issued in counterpart Japanese Patent Application No. 2016-112871 (2 pages).
International Search Report of PCT/JP/2017/008702 dated May 23, 2017.
Shamir Yariv et al., "Intra-fiber mode combining schemes, demonstrating high power brightness preservation and coherent-coupling brightness enhancement", Visual Communications and Image Processing; San Jose, Feb. 20, 2014, vol. 8963, pp. 89630H 1-10, XP060029708, DOI: 10.1117/12.2058099, ISBN 978-1-62841-730-2; cited in Extended European Search Report dated Jan. 8, 2020. (10 pages).
Extended European Search Report dated Jan. 8, 2020, issued in counterpart EP Application No. 17809895.0. (11 pages).
Non-Final Office Action dated Aug. 28, 2019, issued in U.S. Appl. No. 16/306,953 (13 pages).
Notice of Allowance dated Dec. 18, 2019, issued in U.S. Appl. No. 16/306,953 (8 pages).

* cited by examiner

OPTICAL DEVICE

CROSS REFERENCES TO RELATED APPLICATIONS

This application is a continuation of U.S. application Ser. No. 16/306,953, which is the National Stage of International Application No. PCT/JP2017/008702, filed Mar. 6, 2017 which claims priority under 35 U.S.C. § 119 to Japanese Patent Application No. 2016-112871, filed Jun. 6, 2016. The contents of these applications are incorporated herein by reference in their entirety.

TECHNICAL FIELD

The present invention relates to (i) an optical device including an entrance fiber, an exit fiber, and a reduced diameter part, (ii) a laser system including such an optical device, and (iii) a method of producing such an optical device.

BACKGROUND ART

There has been known an optical device via which laser light emitted from a plurality of laser devices is combined into single outgoing light. Such an optical device is called a combiner, a coupler, or the like. For example, Patent Literature 1 discloses an optical device (referred to as "optical fiber combiner" in Patent Literature 1) including (i) a plurality of optical fibers which constitute an entrance fiber (referred to as an "input optical fiber" in Patent Literature 1), (ii) a reduced diameter part (referred to as a "bridge fiber" in Patent Literature 1) having a tapered part, and (iii) an exit fiber (referred to as an "output optical fiber" in Patent Literature 1).

Such an optical device is suitably applicable to, for example, a laser processing machine (i.e., laser system). In the laser processing machine, the optical device is used to cause laser light emitted from a plurality of laser devices to be combined into single outgoing light, so that high-power outgoing light is obtained which cannot be obtained with use of a single laser device. Such a laser processing machine is used for a processing purpose (e.g., cutting or welding) which requires the high-power outgoing light thus obtained.

CITATION LIST

Patent Literature

[Patent Literature 1]
Japanese Patent Application Publication Tokukai No. 2013-190714 (Publication date: Sep. 26, 2013)

SUMMARY OF INVENTION

Technical Problem

In order to carry out high-quality processing with use of the laser processing machine, it is preferable to appropriately select, in accordance with a processing purpose, a spot diameter of outgoing light. This is because a suitable power density of outgoing light varies depending on the processing purpose.

For example, in a case where cutting is carried out, it is preferable to increase a power density of outgoing light by emitting the outgoing light within a narrow range. It is therefore preferable to use outgoing light having a small spot diameter, i.e., outgoing light having a high beam quality. Use of such outgoing light having a high beam quality allows an enhancement in precision of cutting.

In contrast, in a case where welding is carried out, it is preferable to reduce a power density of outgoing light by emitting the outgoing light within a wide range. It is therefore preferable to use outgoing light having a great spot diameter, i.e., outgoing light having a low beam quality. Use of such outgoing light having a low beam quality allows an enhancement in uniformity of welding.

However, the optical device disclosed in Patent Literature 1 is hard to control a beam quality of outgoing light because of the following reason. Specifically, a beam quality of outgoing light obtained with use of such an optical device depends mainly on (i) a shape of the reduced diameter part and (ii) a divergence angle of laser light which enters the reduced diameter part. Therefore, a beam quality of outgoing light obtained with use of the optical device is invariable, unless respective configurations of the entrance fiber and the reduced diameter part are changed. That is, the beam quality is an uncontrollable, inherent feature of the optical device.

Therefore, in a case where processing is carried out for different purposes with use of a laser processing machine, it is necessary to provide, for each of the different purposes, a laser processing machine which can emit outgoing light having a beam quality suitable for the each of the different purposes. This causes an increase in various costs.

The present invention is attained in view of the above problem, and an object of the present invention is to provide (i) an optical device which can control a beam quality of outgoing light, (ii) a laser system including such an optical device, and (iii) a method of producing such an optical device.

Solution to Problem

In order to attain the above object, an optical device in accordance with an aspect of the present invention includes: (1) an entrance fiber bundle which is made up of at least one entrance fiber; (2) an exit fiber; and (3) a reduced diameter part having (i) an entrance end surface to which the entrance fiber bundle is coupled and (ii) an exit end surface to which the exit fiber is coupled, the exit end surface being narrower in area than the entrance end surface, a center of the exit end surface deviating from a center of the entrance end surface, in a case where the entrance end surface is viewed from a normal direction of the entrance end surface.

In order to attain the above object, a laser system in accordance with an aspect of the present invention includes: an optical device including (1) an entrance fiber bundle which is made up of a plurality of entrance fibers, (2) an exit fiber, and (3) a reduced diameter part having (i) an entrance end surface to which the entrance fiber bundle is coupled and (ii) an exit end surface to which the exit fiber is coupled, the exit end surface being narrower in area than the entrance end surface, a center of the exit end surface deviating from a center of the entrance end surface, in a case where the entrance end surface is viewed from a normal direction of the entrance end surface; and a plurality of laser devices each of which includes an exit fiber connected to a corresponding one of the plurality of entrance fibers of the optical device.

In order to attain the above object, a laser system in accordance with an aspect of the present invention includes: an optical device including (1) an entrance fiber bundle which is made up of a single entrance fiber, (2) an exit fiber, and (3) a reduced diameter part having (i) an entrance end surface to which the entrance fiber bundle is coupled and (ii) an exit end surface to which the exit fiber is coupled, the exit end surface being narrower in area than the entrance end surface, a center of the exit end surface deviating from a center of the entrance end surface, in a case where the entrance end surface is viewed from a normal direction of the entrance end surface; and a single laser device including an exit fiber which is connected to the single entrance fiber of the optical device, a region, in which the single entrance fiber is coupled to the entrance end surface of the reduced diameter part, being variable.

In order to attain the above object, a method of producing an optical device in accordance with an aspect of the present invention is a method of producing an optical device including (1) an entrance fiber bundle which is made up of at least one entrance fiber, (2) an exit fiber, and (3) a reduced diameter part having (i) an entrance end surface to which the entrance fiber bundle is coupled and (ii) an exit end surface to which the exit fiber is coupled, the exit end surface being narrower in area than the entrance end surface, the method including the steps of: (a) increasing a deviation of a central axis of one end part of an optical rod from a central axis of the other end part of the optical rod while stretching the optical rod; and (b) cutting out a part of the optical rod which has been stretched in the step (a), the part of the optical rod having both ends which have respective different girths and serving as the reduced diameter part.

Advantageous Effects of Invention

The present invention makes it possible to provide (i) an optical device which can control a beam quality of outgoing light, (ii) a laser system including such an optical device, and (iii) a method of producing such an optical device.

BRIEF DESCRIPTION OF DRAWINGS (a) of FIG. 1 is a perspective view of a combiner in accordance with Embodiment 1 of the present invention. (b) of FIG. 1 is a plan view of an entrance end surface of a reduced diameter part of the combiner illustrated in (a) of FIG. 1.

Figure 2:
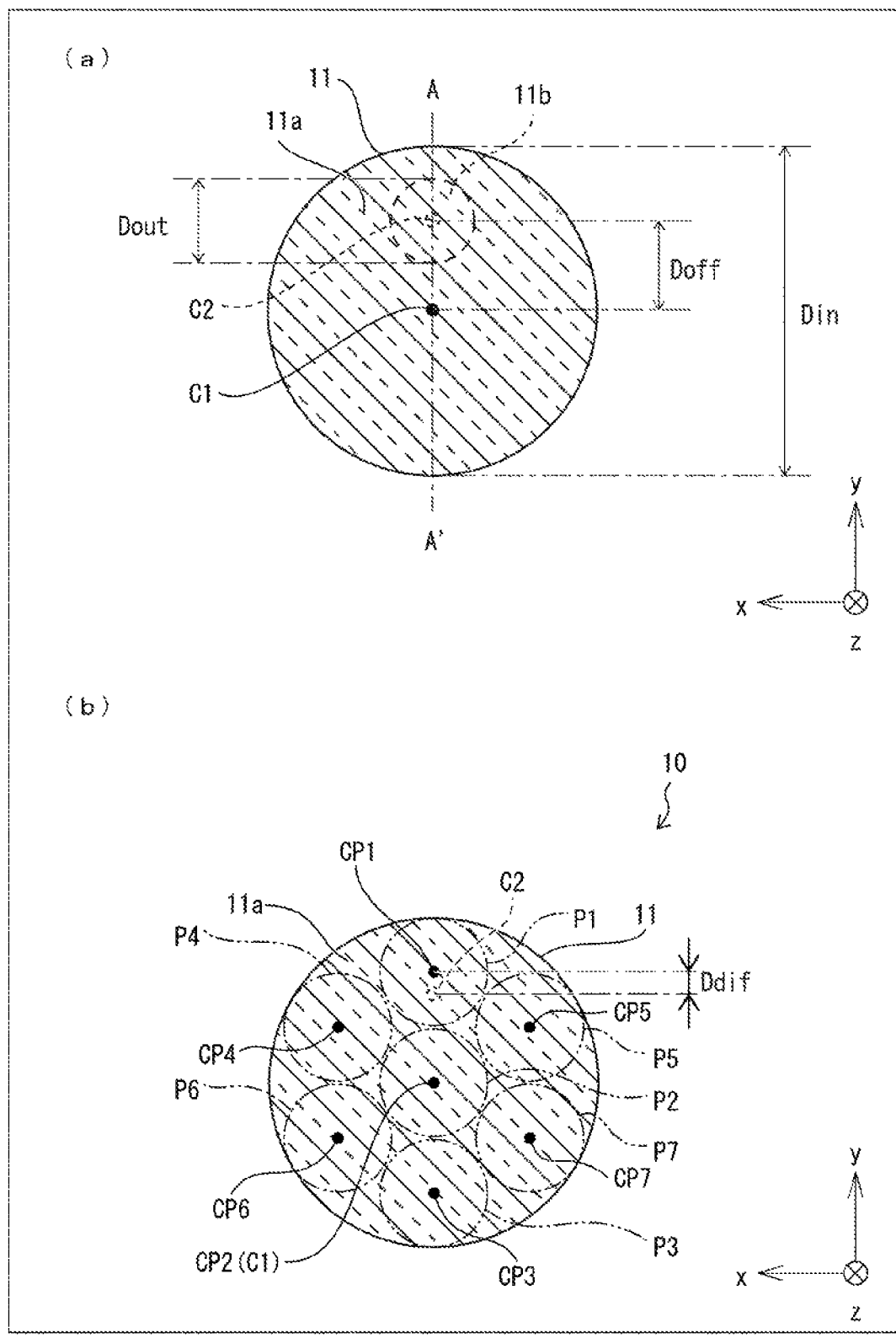

(a) and (b) of FIG. 2 are each a plan view of the entrance end surface of the reduced diameter part of the combiner illustrated in (a) of FIG. 1.

Figure 3:
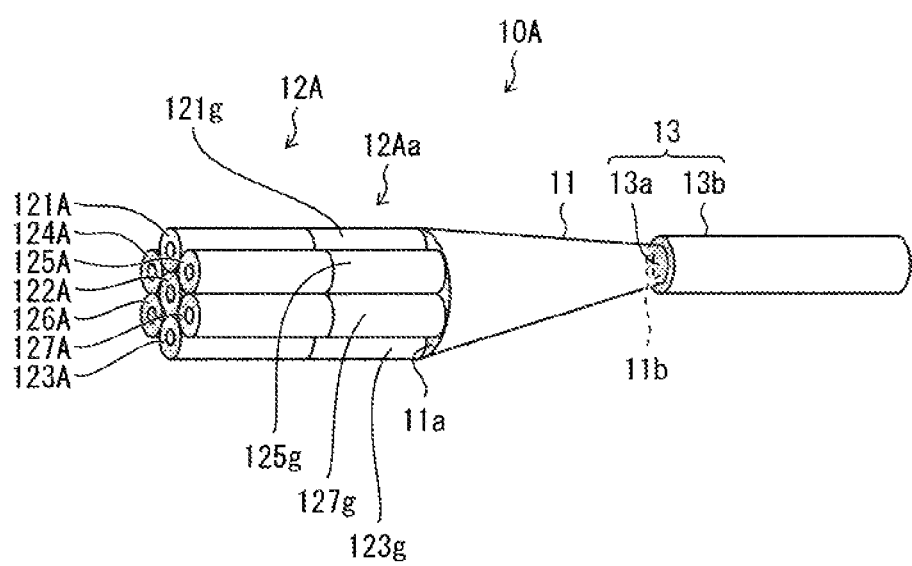

FIG. 3 is a perspective view of Variation 1 of the combiner illustrated in (a) of FIG. 1.

Figure 4:
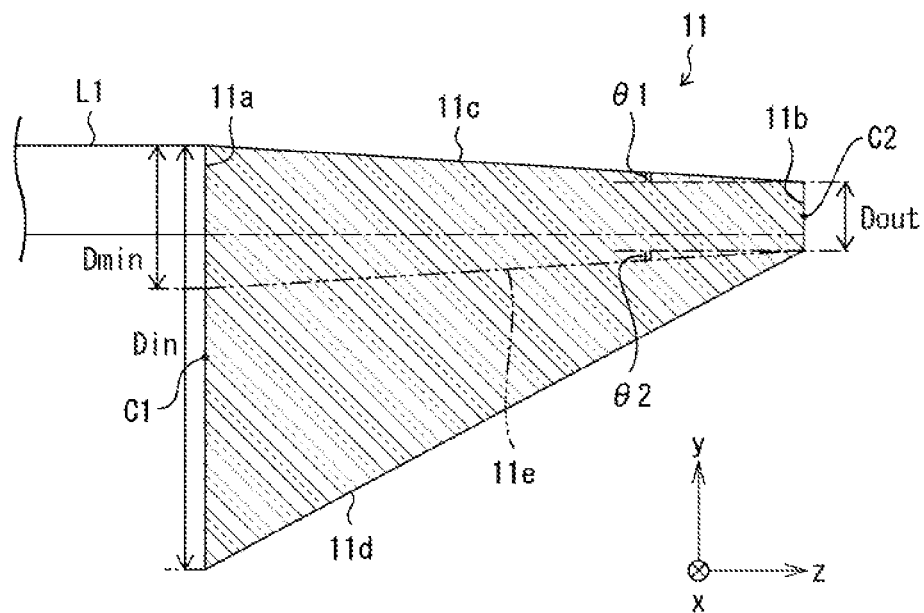
Figure 4:
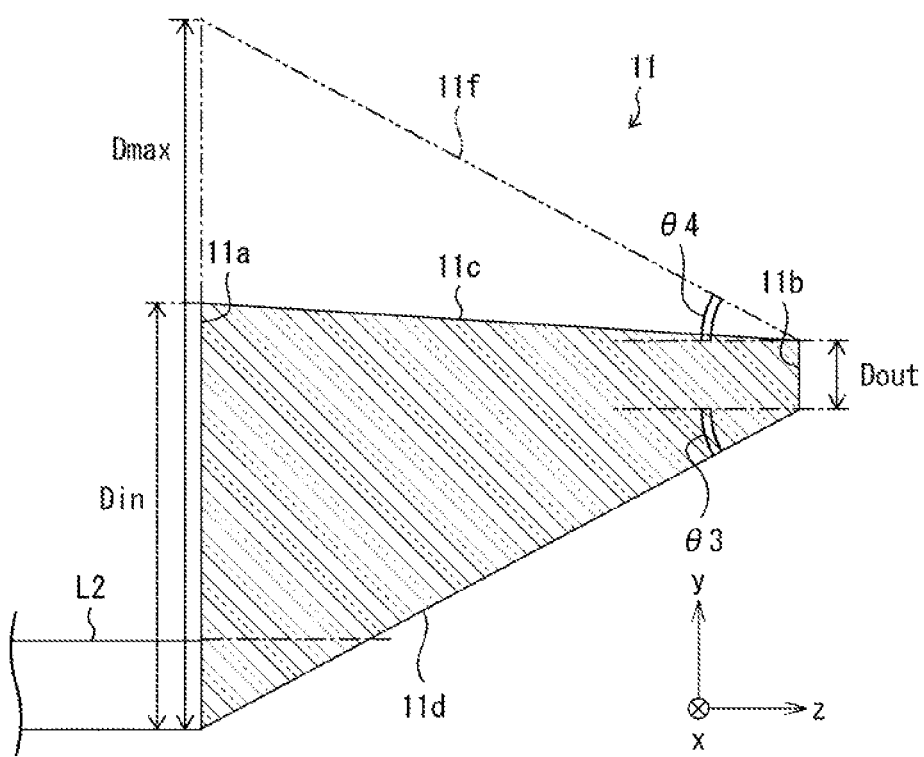

(a) and (b) of FIG. 4 are each a cross-sectional view of the reduced diameter part illustrated in (b) of FIG. 1.

Figure 5:
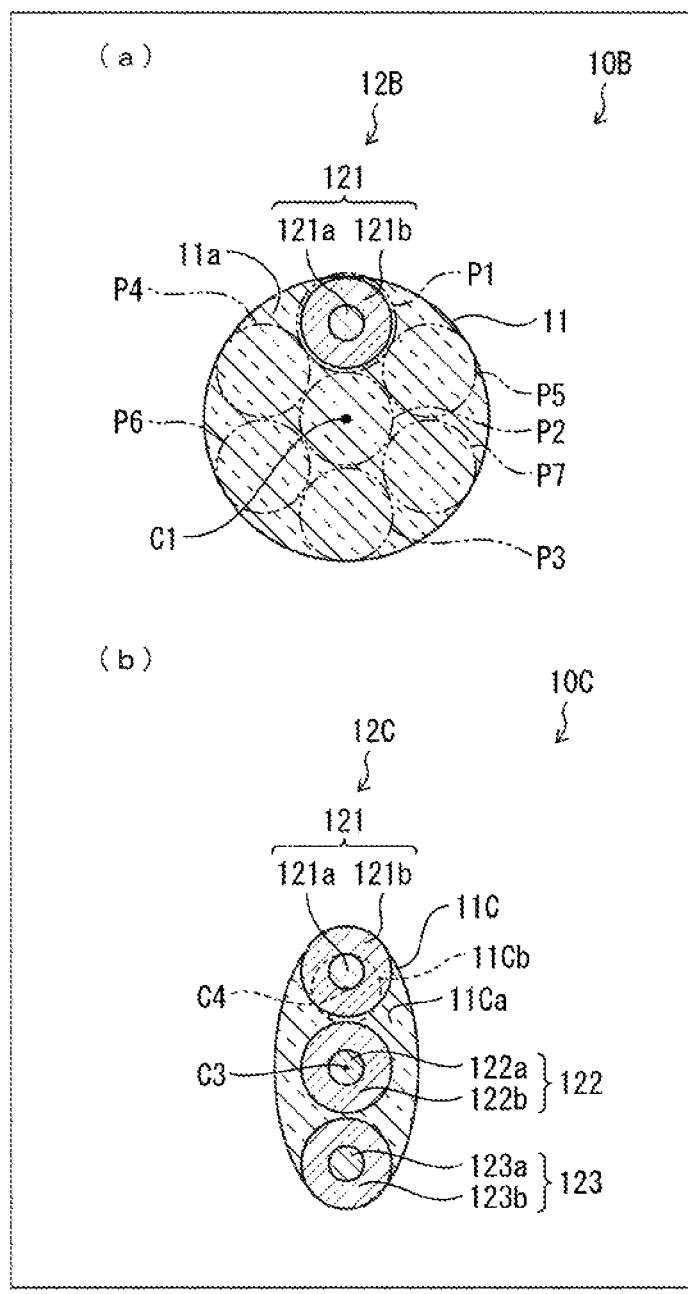

(a) of FIG. 5 is a plan view of a reduced diameter part of and an entrance fiber of Variation 2 of the combiner illustrated in (a) of FIG. 1. (b) of FIG. 5 is a plan view of a reduced diameter part of and an entrance fiber of Variation 3 of the combiner illustrated in (a) of FIG. 1.

Figure 6:
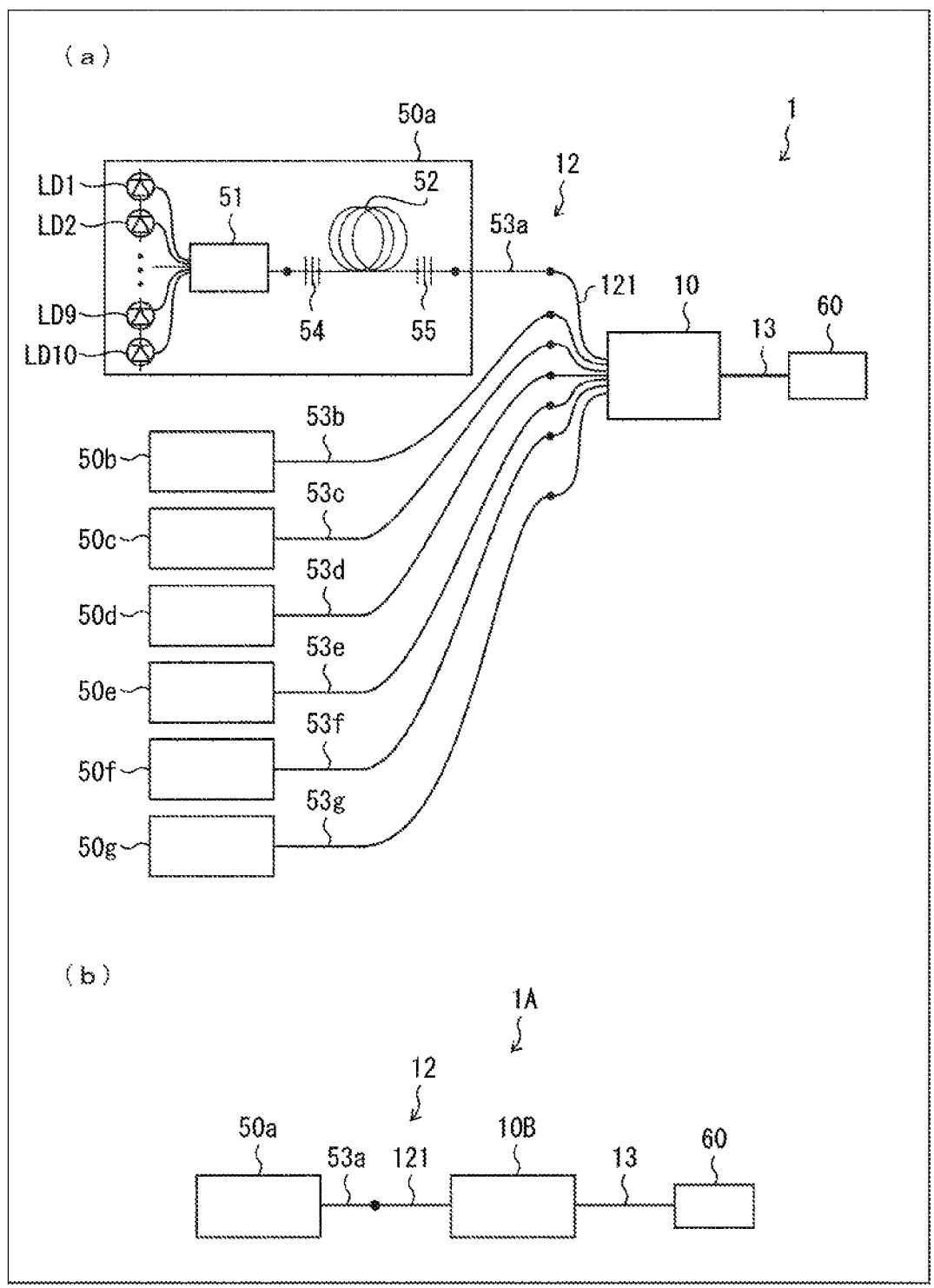

(a) of FIG. 6 is a block diagram illustrating a configuration of a fiber laser system in accordance with Embodiment 2 of the present invention. (b) of FIG. 6 is a block diagram illustrating Variation 1 of the fiber laser system illustrated in (a) of FIG. 6.

Figure 7:
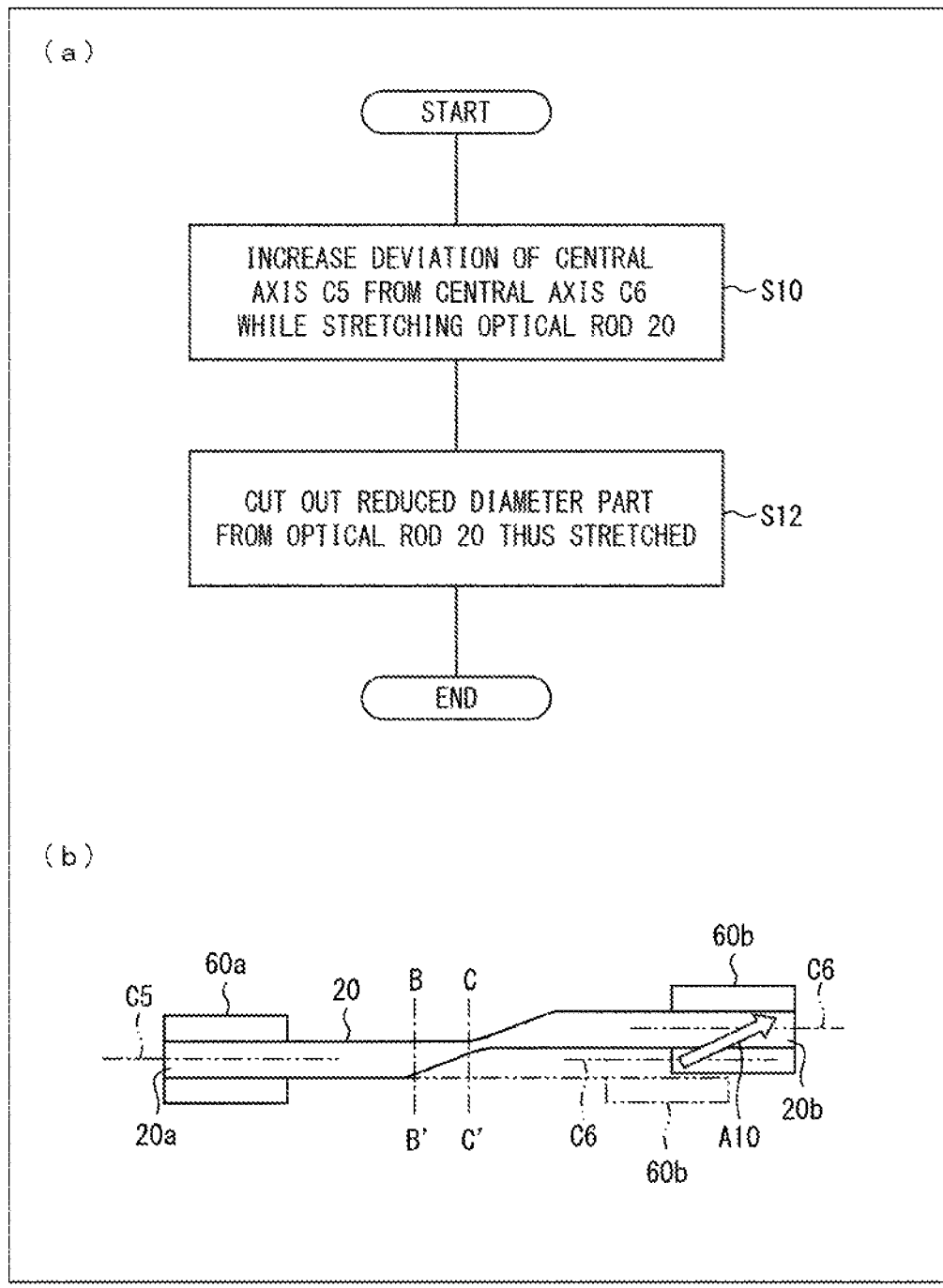

(a) of FIG. 7 is a flowchart depicting a method of producing a reduced diameter part in accordance with Embodiment 3 of the present invention. (b) of FIG. 7 is a plan view schematically illustrating a stretching step of the method (see (a) of FIG. 7) in which the reduced diameter part is produced.

DESCRIPTION OF EMBODIMENTS

Embodiment 1

The following description will discuss, with reference to FIGS. 1 and 2, a combiner 10 in accordance with Embodiment 1 of the present invention. (a) of FIG. 1 is a perspective view of the combiner 10. (b) of FIG. 1 is a plan view of an entrance end surface 11a of a reduced diameter part 11 of the combiner 10, which plan view is obtained in a case where the entrance end surface 11a is viewed from a normal direction of the entrance end surface 11a. (b) of FIG. 1 illustrates the entrance end surface 11a in a state where a plurality of few mode fibers (FMFs) 121 through 127, which constitute an entrance fiber bundle 12, are coupled. (a) and (b) of FIG. 2 are each a plan view of the entrance end surface 11a, which plan view is obtained in a case where the entrance end surface 11a is viewed from a normal direction of the entrance end surface 11a. Note that (b) of FIG. 2 illustrates the entrance end surface 11a in which the FMFs 121 through 127 are omitted.

(Configuration of Combiner 10)

As is illustrated from (a) of FIG. 1, the combiner 10 is an optical device, which includes the reduced diameter part 11, the entrance fiber bundle 12, and an exit fiber 13.

The reduced diameter part 11 is an optical member made of an optical glass such as quartz glass. Specifically, the reduced diameter part 11 is a columnar optical member having two basal planes. One of the two basal planes serves as the entrance end surface 11a, and the other serves as an exit end surface 11b. The exit end surface 11b is narrower in area than the entrance end surface 11a. The entrance end surface 11a is coupled to the entrance fiber bundle 12. The exit end surface 11b is coupled to the exit fiber 13.

The reduced diameter part 11 can be obtained from an oblique circular cone (i) whose basal plane serves as a basal plane of the reduced diameter part 11 and (ii) whose top part is cut out therefrom. The shape of the reduced diameter part 11 can be alternatively obtained from a circular truncated cone, by inclining, with respect to a normal line of the bottom surface of the circular truncated cone, a central axis of the circular truncated cone. Note that the central axis indicates a line segment connecting centers of both basal planes of the circular truncated cone.

The entrance fiber bundle 12 is made up of seven entrance fibers (i.e., the FMFs 121 through 127). The exit fiber 13 is made up of a single multi-mode fiber (MMF). The FMFs 121 through 127 and the exit fiber 13 are each made of, for example, quartz glass.

As is illustrated in (b) of FIG. 1, the FMF 121 includes a core 121a and a cladding 121b. Similarly, the FMFs 122 through 127 include cores 122a through 127a and claddings 122b through 127b, respectively. The FMFs 121 through 127 are arranged such that the FMFs 121 and 123 through 127 isotropically surround the FMF 122 and form a rectangular hexagon. In Embodiment 1, an end surface of each of the FMFs 121 through 127 and the entrance end surface 11a are connected by fusion splicing.

The exit fiber 13 includes a core 13a and a cladding 13b. The core 13a is configured to have a diameter which is equal to a diameter Dout of the exit end surface of the reduced diameter part 11 (see (c) of FIG. 1). In Embodiment 1, an end surface of the core 13a of the exit fiber 13 and the exit end surface 11b are connected by fusion splicing.

Note that each of the FMFs 121 through 127, which constitute the entrance fiber bundle 12, only needs to be optically coupled to the entrance end surface 11a of the reduced diameter part 11. The end surface of each of the FMFs 121 through 127 can be away from the entrance end surface 11a. Furthermore, a means of connecting the end surface of each of the FMFs 121 through 127 to the entrance end surface 11a is not limited to fusion splicing.

Alternatively, the end surface of each of the FMFs 121 through 127 can be bonded to the entrance end surface 11a with use of, for example, an adhesive made of a resin which has an excellent transmittance in a wavelength region of light used in the combiner 10. The same applies to coupling of the exit fiber 13 to the exit end surface 11b of the reduced diameter part 11.

A broken line shown in (a) of FIG. 2 indicates the exit end surface 11b projected to the entrance end surface 11a. In a case where the entrance end surface 11a is viewed from the normal direction of the entrance end surface 11a, a center C2 of the exit end surface 11b deviates from a center C1 of the entrance end surface 11a. Here, a distance between such a center C1 and such a center C2 is referred to as an offset amount Doff (i.e., a distance Doff, obtained in a case where the entrance end surface 11a is viewed from the normal direction of the entrance end surface 11a, which is recited in the claims). The offset amount Doff indicates a degree of deviation of the center C1 from the center C2. It follows that the greater the offset amount Doff is, the greater the degree of the deviation of the center C1 from the center C2 becomes.

A region, to which the FMF 122 is connected and in which the center C1 is included, is referred to as a region P2 (see (b) of FIG. 2). A center of the region P2 is referred to as a center CP2. The center CP2 corresponds to a center of the FMF 122 coupled to the entrance end surface 11a. In the combiner 10, the center C1 matches the center CP2.

The region P2 is arranged so as to be surrounded by six regions (i.e., regions P1 and P3 through P7). Hereinafter, centers of the regions P1 and P3 through P7 are referred to as centers CP1 and CP3 through CP7, respectively. The region P1 is a region to which the FMF 121 is connected. The center CP1 corresponds to a center of the FMF 121 which is coupled to the entrance end surface. Similarly, the regions P3 through P7 are regions to which the FMFs 123 through 127 are connected, respectively. The centers CP3 through CP7 correspond to centers of the FMFs 123 through 127, respectively, which are coupled to the entrance end surface. The regions P1 and P3 through P7 are isotropically arranged around the region P2. That is, the regions P1 and P3 through P7 are arranged such that the centers CP1 and CP3 through CP7 serve as respective apexes of a regular hexagon. In other words, the FMFs 121 through 127 are arranged so as to form a closest packing structure in the entrance end surface 11a.

A line A-A' shown in (a) of FIG. 2 is a straight line on which the center C1 and the center C2 are located. A distance, obtained in a case where the entrance end surface 11a is viewed from the normal direction of the entrance end surface 11a, between the center C2 and the respective centers CP1 through CP7 in a corresponding one of the regions P1 through P7 is referred to as a distance Ddif. (b) of FIG. 2 illustrates, as an example, the distance Ddif with respect to the region P1. The distance Ddif indicates a deviation of a region in which incoming light is coupled to the reduced diameter part 11 from a region in which outgoing light is coupled to the reduced diameter part 11. The greater the distance Ddif is, the greater the deviation of the region in which the incoming light is coupled from the region in which outgoing light is coupled becomes.

In the combiner 10, in a case where the entrance end surface 11a is viewed from the normal direction of the entrance end surface 11a, (i) the center C1 is away in a direction, by the offset amount Doff, from the center C2 and (ii) such a direction is a direction in which the center C2 approaches the center CP1 (i.e., a direction in which the center C2 is away from the center CP7). The distance Ddif therefore has the following magnitude relationship (see (b) of FIG. 2). Note that, in a case where the distance Ddif is differentiated among the regions P1 through P6, a corresponding symbol is added as, for example, a distance Ddif (P1).

$Ddif(P1) < Ddif(P2) < Ddif(P4), Ddif(P5) < Ddif(P6), Ddif(P7) < Ddif(P3)$

Note that Embodiment 1 has been discussed under an assumption that the reduced diameter part 11 has a diameter (i.e., a length which intersects with the central axis of the circular truncated cone and which extends along a y-axis direction in a coordinate system shown in FIG. 1) which continuously varies along the central axis of the circular truncated cone. However, the reduced diameter part 11 can further include a part (i.e., a columnar part), having a diameter which does not vary depending on the central axis of the circular truncated cone, which is provided at least one of a front part of and a rear part of a part (i.e., circular truncated cone part) having a diameter which continuously varies depending on the central axis of the circular truncated cone. Such a columnar part continues into the circular truncated cone part, via an end surface. The other end surface of the columnar part forms the entrance end surface 11a or the exit end surface 11b of the reduced diameter part 11.

(Effect of Combiner 10)

In order to discuss an effect brought about by the combiner 10, the following description will first briefly discuss a numerical aperture NA of and a beam quality of light. The numerical aperture NA of light is expressed by $NA = \sin \theta$, where $\theta$ indicates a divergence angle (i.e., half angle) of propagating light.

A beam parameter product (BBP) is known as an index for indicating the beam quality. The BPP is expressed by $R \times \theta$ (mm·mrad), where (i) R indicates a radius of a core which light exits and (ii) $\theta$ indicates a divergence angle (half angle) of light which has exited the core. Here, light, which exits the reduced diameter part 11 via the exit end surface, is supposed. Therefore, the core which causes light to exit is the exit end surface 11b, and the radius R which is expressed by $R = Dout/2$ is constant.

As has been discussed, the numerical aperture of and the beam quality of light are each an index which is indicated by a divergence angle $\theta$ of the light, and one can therefore be found by the other. That is, "light has a small numerical aperture" means that the light has a high beam quality, whereas "light has a great numerical aperture" means that the light has a low beam quality.

In the combiner 10, a numerical aperture NA of light, which has entered the reduced diameter part 11, increases while the light is propagating through the reduced diameter part 11. In other words, a beam quality of light which has entered the reduced diameter part 11 is reduced while the light is propagating through the reduced diameter part 11.

Deterioration in beam quality of light, which is caused while the light is propagating through the reduced diameter part 11, varies depending on the distance Ddif. Specifically, the deterioration in beam quality of light becomes smaller as the light enters a region in which the distance Ddif is smaller.

Whereas the deterioration in beam quality of light becomes larger as the light enters a region in which the distance Ddif is larger. In other words, the deterioration in beam quality of light becomes the smallest, in a case where the light enters (1) the region P1, and the deterioration in beam quality of light becomes larger, in a case where the light enters (2) the region P2, (3) the region P4 or P5, (4) the region P6 or P7, and (5) the region P3, in this order. The deterioration in beam quality will be discussed later with reference to FIG. 4.

The reduced diameter part 11 thus allows outgoing light to be coupled to the exit fiber 13. The deterioration in beam quality of the outgoing light varies depending on the distance Ddif. It follows that the combiner 10 can control a beam quality of outgoing light which exits the exit end surface 11b, by appropriately selecting any of the FMFs 121 through 127 which are connected to the entrance end surface 11a. This ultimately makes it possible to control a beam quality of light which exits the exit fiber 13.

In order to control, within a wider range, a beam quality of outgoing light which exits the combiner 10, it is required to configure the reduced diameter part 11 such that (i) an upper limit of the beam quality can be increased and (ii) a lower limit of the beam quality can be reduced. To this end, it is required to locate the exit end surface 11b with respect to the entrance end surface 11a such that the center C2 of the exit end surface 11b is close to the center CP1 of the region P1 (i.e., such that the center C2 of the exit end surface 11b is away from the center CP7 of the region P7).

In order to meet the requirement, the following inequality is preferably satisfied in the reduced diameter part 11:

$$Din/10 \leq Doff \leq (Din-Dout)/2$$

where: Doff indicates the offset amount; Din indicates a maximum width of the entrance end surface 11a; and Dout indicates a maximum width of the exit end surface 11b.

In Embodiment 1, the entrance end surface 11a and the exit end surface 11b each have a round shape. Therefore, the maximum width Din is synonymous with a diameter of the entrance end surface 11a, and the maximum width Dout is synonymous with a diameter of the exit end surface 11b.

By satisfying the inequality $Din/10 \leq Doff$, it becomes possible, as compared with a case where the inequality is not satisfied, to (i) further increase a beam quality of light having a high beam quality (i.e., a beam quality of light which has entered the combiner 10 via the FMF 121) and (ii) further reduce a beam quality of light having a low beam quality (i.e., a beam quality of light which has entered the combiner 10 via the FMF 123). It is therefore possible to broaden a range within which a beam quality of light, which exits the reduced diameter part 11, can be controlled.

Note that satisfaction of the inequality $Din/10 \leq Doff$ means that a numerical aperture NAmax becomes not less than 1.5 times a numerical aperture NAmin, where (i) the numerical aperture NAmax indicates a numerical aperture of light which has the highest beam quality of the light which exits the reduced diameter part 11 and (ii) the numerical aperture NAmin indicates a numerical aperture of the light which has the lowest beam quality of the light which exits the reduced diameter part 11. This will be later discussed with reference to FIG. 4.

The state, in which the inequality $Doff \leq (Din-Dout)/2$ is satisfied, indicates a state in which, in a plan view which is obtained in a case where the entrance end surface 11a is viewed from the normal direction of the entrance end surface 11a (see (a) of FIG. 2), the entrance end surface 11a properly encompasses the exit end surface 11b, i.e., the exit end surface 11b exists only inside the entrance end surface 11a. With the configuration, it is possible to restrain a beam quality of light, which exits the reduced diameter part 11, from being deteriorated. Note that the deterioration in beam quality is caused by an excessive increase in the offset amount Doff.

The entrance end surface 11a and the exit end surface 11b, which constitute the respective basal planes of the reduced diameter part 11, each have a round shape. This allows the reduced diameter part to be realized by stretching an existing columnar optical member such as an optical rod. It is thus possible to realize the reduced diameter part with use of an easily-available optical member. This allows a reduction in cost for realizing the optical device. Note that a method of producing the combiner 10 will be discussed later with reference to FIG. 7.

As has been discussed, the entrance fiber bundle 12 of the combiner 10 is made up of the plurality of FMFs 121 through 127. The plurality of FMFs 121 through 127 are coupled to respective regions (i.e., the regions P1 through P7) of the entrance end surface 11a of the reduced diameter part 11, in which regions the distances Ddif differ from each other. The FMF 121 is coupled to a region in which the distance Ddif is small. The FMF 122 is coupled to a region in which the distance Ddif is moderate. The FMF 123 is coupled to a region in which the distance Ddif is large. The FMFs 124, 125, 126, and 127 are each coupled to a corresponding region in which the distance Ddif is an intermediate value between (i) the distance Ddif of the FMF 122 and (ii) the distance Ddif of the FMF 123.

It is therefore possible to obtain outgoing light having a predetermined beam quality, by (i) appropriately selecting an FMF or a plurality of FMFs from the FMFs 121 through 127 and (ii) causing light to enter the reduced diameter part 11 via the FMF or the plurality of FMFs thus selected. In so doing, one or more of the FMFs 121 through 127 can be selected. In a case of selecting the plurality of FMFs, it is preferable to select adjacent FMFs (e.g., in a case of selecting three MFMs, it is preferable to select, for example, adjacent three FMFs 122, 124, and 125 or adjacent three FMFs 123, 126, and 127) so that a beam quality of outgoing light is prevented from being distributed in a wide range. This is because the distance Ddif (P2) differs in value from the distances Ddif (P4) and Ddif (P5) but a difference between any two of the distances Ddif (P2), Ddif (P4), and Ddif (P5) is small. The same applies to the distances Ddif (P3), Ddif (P6), and Ddif (7). By thus selecting, as a single group, the distances Ddif between any two of which there is a small difference, it is possible to obtain outgoing light in which (i) the distribution of beam qualities has a narrower breadth and (ii) output power is higher as compared with a configuration in which a single FMF is employed.

Note that Embodiment 1 has been discussed under an assumption that (i) the entrance fiber bundle 12 is made up of a plurality of FMFs and (ii) the exit fiber 13 is made up of a single MMF. However, (1) optical fibers, which constitute the entrance fiber bundle 12, are not limited to FMFs and (2) optical fibers, which constitute the exit fiber 13, are not limited to MMFs.

Embodiment 1 employs a configuration in which the entrance fiber bundle 12 is made up of seven entrance fibers (i.e., the FMFs 121 through 127). However, the entrance fiber bundle 12 can be made up of any number of entrance fibers. The entrance fiber bundle 12 can alternatively be made up of, for example, three entrance fibers or nineteen entrance fibers.

(Variation 1)

The following description will discuss, with reference to FIG. 3, a combiner 10A which is Variation 1 of the combiner 10. FIG. 3 is a perspective view of the combiner 10A.

The combiner 10A is identical in configuration to the combiner 10, except that the combiner 10A includes an entrance fiber bundle 12A instead of the entrance fiber bundle 12.

In Variation 1, graded index (GI) fibers are provided between the entrance fiber bundle 12A and a reduced diameter part 11. That is, the entrance fiber bundle 12 is coupled to the reduced diameter part 11, via the GI fibers which constitute an end part 12Aa of the entrance fiber bundle 12A.

As is illustrated in FIG. 3, the entrance fiber bundle 12A is made up of sevens FMFs 121A through 127A. A GI fiber 121a, which corresponds to the FMF 121A, is provided between the FMF 121A and an entrance end surface 11a of the reduced diameter part 11. The FMF 121A is thus coupled to the reduced diameter part 11, via the GI fiber 121g. Similarly, GI fibers 122g through 127g, which correspond to the FMFs 122A through 127A, respectively, are each provided between a corresponding one of the FMFs 122A through 127A and the entrance end surface 11a.

The following description will discuss the GI fibers, by taking the GI fiber 121g as an example. The same applies to each of the GI fibers 122g through 127g. The GI fiber 121g is configured to have a refractive index which (i) is maximized at its central axis and (ii) decreases as a distance from the central axis increases. The GI fiber 121g thus configured can restrain a divergence angle of light which has entered the GI fiber 121g, and therefore allows outgoing light having a small divergence angle to exit the GI fiber 121g. Note that a degree, by which the divergence angle is restrained, periodically varies depending on a length of the GI fiber 121g. The length of the GI fiber 121g in accordance with Variation 1 is set to a reference length which causes collimate light to exit (i.e., a length (2n−1)/4 times a cycle of the GI fiber 121g, where n is a positive integer, and n=1 in Variation 1). The GI fiber 121g in accordance with Variation 1 therefore allows collimate light to exit the GI fiber 121g.

As a result, a divergence angle of light which exits the reduced diameter part 11 can be made smaller as compared with a case of the combiner 10. This allows an enhancement of coupling efficiency between the reduced diameter part 11 and the exit fiber 13, and ultimately allows the combiner 10A to restrain an optical loss.

Since collimate light is coupled to the entrance end surface 11a of the reduced diameter part 11, it is possible to restrain the number of times by which light is reflected by a side surface of the reduced diameter part 11 while the light is being guided through the reduced diameter part 11. This allows a further enhancement of a maximum beam quality of light which exits the reduced diameter part 11. Specifically, it is possible to further enhance a beam quality of light which (i) enters the entrance end surface 11a via the GI fiber 121g and then (ii) exits the exit end surface 11b. This ultimately makes it possible to further broaden the range within which a beam quality of light, which exits the reduced diameter part 11, can be controlled.

Note that a length of each of the GI fibers 121g through 127g is not limited to the length (2n−1)/4 times the cycle of the GI fiber 121g. The length of each of the GI fibers 121g through 127g only needs to be a length which allows a divergence angle of outgoing light to be restrained as compared with that of incoming light, i.e., a length other than a length m/2 times a cycle of a corresponding GI fiber (where m is a positive integer).

(Imaginary Beam Diameter)

The following description will discuss, with reference to FIG. 4, a concept of an imaginary beam diameter which greatly affects a beam quality of light. (a) and (b) of FIG. 4 are each a cross-sectional view of the reduced diameter part 11, the cross-sectional view being taken in a plane (i.e., y-z plane) along the line A-A' shown in FIG. 2. The following description will further discuss why (i) satisfaction of the inequality Din/10≤Doff is synonymous with (ii) satisfaction of the inequality 1.5×NAmin≤NAmax (where NAmax and NAmin indicate respective numerical apertures) which has been described. Note that (i) the numerical aperture NAmax is a maximum of numerical apertures NA of light which exits the combiner 10 and (ii) the numerical aperture NAmin is a minimum of the numerical apertures NA of light which exits the combiner 10.

(a) of FIG. 4 illustrates a state in which light L1, whose top matches a top of the entrance end surface 11a, has entered the entrance end surface 11a of the reduced diameter part 11. (b) of FIG. 4 illustrates a state in which light L2, whose bottom matches a bottom of the entrance end surface 11a, has entered the entrance end surface 11a. Note that each of the light L1 and the light L2 is collimate light.

The reduced diameter part 11 illustrated in FIG. 4 has a cross section, which has a shape of a trapezoid whose lower base corresponds to the entrance end surface 11a and whose upper base corresponds to the exit end surface 11b. In the trapezoid, (i) an oblique side, which is closer to the center C2 of the exit end surface 11b, is referred to as an oblique side 11c and (ii) an oblique side, which is away from the center C2, is referred to as an oblique side 11d. It follows that an angle θ1, formed where the oblique side 11c and a normal line of the exit end surface 11b cross each other, is smaller than an angle θ3 formed where the oblique side 11d and the normal line of the exit end surface 11b cross each other.

An imaginary beam diameter Dmin of the light L1 is found based on a distance between (i) the oblique side 11c of the reduced diameter part 11 and (ii) an imaginary line 11e (see (a) of FIG. 4). The imaginary beam diameter of the light L1 is the smallest among imaginary beam diameters which can be obtained in the reduced diameter part 11. Note that the imaginary line 11e is a line segment, passing through a lower end part of the exit end surface 11b, so that an angle θ2, which is at an angle with the normal line of the exit end surface 11b, satisfies θ2=θ1.

An imaginary beam diameter Dmax of the light L2 is found based on (i) the oblique side 11d of the reduced diameter part 11 and (ii) an imaginary line 11f (see (b) of FIG. 4). The imaginary beam diameter of the light L2 is the largest among the imaginary beam diameters which can be obtained in the reduced diameter part 11. Note that the imaginary line 11f is a line segment, passing through an upper end part of the exit end surface 11b, so that an angle θ4, which is at an angle with the normal line of the exit end surface 11b, satisfies θ4=θ3.

A reduced diameter rate is expressed by a ratio of the diameter Dout of the exit end surface 11b to the imaginary beam diameter. The reduced diameter rate is a parameter which greatly affects the beam quality (e.g., BPP). The greater the reduced diameter rate is (i.e., the smaller the imaginary beam diameter is), the higher the beam quality of light is. In other words, the smaller the reduced diameter rate is (i.e., the greater the imaginary beam diameter is), the lower the beam quality of light is.

The imaginary beam diameters Dmin and Dmax are respectively expressed as below.

$$Dmin=Din-2\times Doff$$

$$Dmax=Din+2\times Doff$$

where Din indicates the diameter of the entrance end surface 11a and Doff indicates the offset amount.

In a case of substituting Doff=Din/10 so as to obtain a ratio of the imaginary beam diameter Dmax to the imaginary beam diameter Dmin, Dmax/Dmin is equal to 1.5. Therefore, satisfaction of the inequality Din/10≤Doff is synonymous with (i) satisfaction of the inequality Dmax/Dmin≥1.5 and (ii) satisfaction of the inequality 1.5×NAmin≤NAmax.

(Variation 2)

The following description will discuss, with reference to (a) of FIG. 5, a converter 10B which is Variation 2 of the combiner 10. The following description will further discuss, with reference to (b) of FIG. 5, a combiner 10C which is Variation 3 of the combiner 10. (a) of FIG. 5 is a plan view of a reduced diameter part 11 of and an entrance fiber bundle 12B of the converter 10B. (b) of FIG. 5 is a plan view of a reduced diameter part 11C of and an entrance fiber bundle 12C of the combiner 10C.

The converter 10B is an optical device which includes the entrance fiber bundle 12B instead of the entrance fiber bundle 12. As is illustrated in (a) of FIG. 5, the entrance fiber bundle 12B differs from the entrance fiber bundle 12 of the combiner 10 in that the entrance fiber bundle 12B is made up of a single entrance fiber (i.e., FMF 121). The FMF 121 includes a core 121a and a cladding 121b.

A central region, which includes a center C1, of an entrance end surface 11a of the reduced diameter part 11 is referred to as a region P2. Six regions surrounding the region P2 are referred to as respective regions P1 and P3 through P7. The regions P1 and P3 through P7 isotropically surround the region P2 so as to form a regular hexagon.

The region P1 corresponds to the region in the combiner 10, in which region the FMF 121 is coupled. The regions P2 through P7 correspond to the regions in the combiner 10, in which regions the respective FMFs 122 through 127 are coupled.

In the converter 10B, the FMF 121 is coupled to a region of the entrance end surface 11a of the reduced diameter part 11. Such a region is not fixed to a specific region and is therefore variable. In order to obtain outgoing light having a preferable beam quality, a user can (i) select any one of the regions P1 through P7 and then (ii) cause the FMF 121 to be coupled to a region of the entrance end surface 11a thus selected.

The converter 10B can thus control a beam quality of outgoing light, instead of employing a plurality of FMFs, i.e., instead of employing a plurality of fiber laser systems. The converter 10B therefore can realize an optical device which can control a beam quality of outgoing light, with use of a simpler configuration as compared with the combiner 10A.

Note that Variation 2 has discussed the configuration in which (i) the regions P1 through P7 are provided in advance in the entrance end surface 11a and (ii) the FMF 121 is caused to be coupled to any one of the regions thus provided. Note, however, that a region of the entrance end surface 11a, to which region the FMF 121 is coupled, is not limited to any of the regions P1 through P7. Specifically, the user can determine, as appropriate, a region of the entrance end surface 11a to which region the FMF 121 is coupled.

Note also that Variation 2 employs a configuration in which the entrance fiber bundle 12B is made up of the single FMF 121. However, the entrance fiber bundle 12B can alternatively be made up of two or more FMFs. The number of FMFs which constitute the entrance fiber bundle 12B can arbitrarily be determined, within a range of numbers which allows the entrance fiber bundle 12B to be coupled to the entrance end surface 11Ca.

(Variation 3)

The combiner 10C is an optical device which includes (i) the reduced diameter part 11C instead of the reduced diameter part 11 and (ii) the entrance fiber bundle 12C instead of the entrance fiber bundle 12.

As is illustrated in (b) of FIG. 5, the reduced diameter part 11C has an entrance end surface 11Ca having a shape of an ellipsoid. The reduced diameter part 11C is identical in configuration to the reduced diameter part 11, except for the shape of the entrance end surface 11Ca. Therefore, in a case where the entrance end surface 11Ca is viewed from a normal direction of the entrance end surface 11Ca, a center C4 of the exit end surface 11Cb deviates from a center C3 of the entrance end surface 11Ca.

The entrance fiber bundle 12C is made up of three entrance fibers (i.e., FMFs 121 through 123) so as to match the shape of the entrance end surface 11Ca of the reduced diameter part 11C. According to the FMF 122, a center of the FMF 122 is arranged so as to match the center C4 of the entrance end surface 11Ca. The FMF 121 is provided above the FMF 122. The FMF 123 is provided below the FMF 122.

The shape of the entrance end surface 11Ca of the reduced diameter part 11C is not thus limited to a round shape.

Embodiment 2

The following description will discuss, with reference to (a) of FIG. 6, a fiber laser system 1 in accordance with Embodiment 2 of the present invention. (a) of FIG. 6 is a block diagram illustrating a configuration of the fiber laser system 1. The following description will subsequently discuss, with reference to (b) of FIG. 6, a fiber laser system 1A which is a Variation of the fiber laser system 1. (b) of FIG. 6 is a block diagram illustrating a configuration of the fiber laser system 1A.

(Fiber Laser System 1)

As is illustrated from (a) of FIG. 6, the fiber laser system 1 (corresponding to a laser system recited in the claims) includes (i) a combiner 10 which has been discussed in Embodiment 1, (ii) seven fiber laser devices 50a through 50g, and (iii) a laser head 60.

Each of the fiber laser devices 50a through 50g is configured to generate laser light, and is an example of a laser device. The laser device in accordance with Embodiment 2 is not specifically limited to a fiber laser device. The fiber laser devices 50a through 50g are similarly configured to each other. The following description will discuss how they are configured, by taking the fiber laser device 50a as an example. Laser light generated by the fiber laser device 50a enters the combiner 10, and is combined with laser light generated in the other fiber laser devices 50b through 50g. A workpiece (i.e., processing target object which is not illustrated) is irradiated with the laser light thus combined in the combiner 10, via the laser head 60.

The fiber laser device 50a can be constituted by (i) an electric current source (not illustrated), (ii) ten laser diodes LD1 through LD10, (iii) a pump combiner 51, (iv) a high-reflection fiber Bragg grating (FBG) 54, (v) a double cladding fiber (DCF) 52, (vi) a low-reflection fiber Bragg grating (FBG) 55, and (vii) a delivery fiber 53a (i.e., an exit fiber recited in the claims). Note that the number of the laser diodes is not limited to ten, and can therefore be any arbitrary number.

The laser diodes LD1 through LD10 are each configured to generate pump light. Each of the laser diodes LD1 through LD10 is connected to a corresponding input port of the pump combiner 51. Pump light generated in each of the laser diodes LD1 through LD10 enters the pump combiner 51.

The pump combiner 51 is configured to combine pump light generated in each of the laser diodes LD1 through LD10 so that combined pump light is obtained. The pump combiner 51 includes an output port which is connected to the DCF 52, via the high-reflection FBG 54. The combined pump light thus obtained in the pump combiner 51 passes through the high-reflection FBG 54, and then enters an inner cladding of the DCF 52.

The DCF 52 is configured to convert, into laser light, pump light combined in the pump combiner 51. The DCF 52 includes a core to which a rare earth element (such as Yb) is added. Combined pump light, obtained in the pump combiner 51, is used to maintain the rare earth element in a population inversion state. The DCF 52, the high-reflection FBG 54, and the low-reflection FBG 55 constitute a resonator. The high-reflection FBG 54 is connected to an input terminal of the DCF 52. The low-reflection FBG 55 is connected to an output terminal of the DCF 52. In the core of the DCF 52, the rare earth element, maintained in the population inversion state, repeats induced emission, so that laser light are generated. The output terminal of the DCF 52 is connected, via the low-reflection FBG 55, to an FMF 121 which constitutes an entrance fiber bundle 12 of the combiner 10. Out of laser light generated in the DCF 52, laser light which has passed through the low-reflection FBG 55 enters the delivery fiber 53a which is connected to the fiber laser device 50a, and in turn enters the FMF 121.

Similarly, delivery fibers 53b through 53g of the fiber laser devices 50b through 50g are connected to FMFs 122 through 127, respectively, which constitute the entrance fiber bundle 12.

The combiner 10 combines, into single output light, laser light emitted from each of the fiber laser devices 50a through 50g. Output light which exits the combiner 10 via an exit fiber 13 enters the laser head 60.

The laser head 60 is configured to prevent, from reentering the exit fiber 13, output light which was emitted via the exit fiber 13 and was then reflected by the workpiece. The laser head 60 is constituted by, for example, (i) a glass block and (ii) a housing which houses the glass block. The workpiece is irradiated with output light which has exited the laser head 60.

In a case where the workpiece is irradiated with output light having a high beam quality, it is sufficient to activate, for example, the fiber laser device 50a. In a case where the fiber laser device 50a is activated, laser light enters the FMF 121. Output light, having a high beam quality, is therefore outputted to the laser head 60, via the exit fiber 13.

In a case where the workpiece is irradiated with output light having a moderate beam quality, it is sufficient to activate, for example, the three fiber laser devices 50b, 50d, and 50e. In a case where the fiber laser devices 50b, 50d, and 50e are activated, laser light enters each of the FMFs 122, 124, and 125. Output light, having a moderate beam quality, is therefore outputted to the laser head 60, via the exit fiber 13.

In a case where the workpiece is irradiated with output light having a low beam quality, it is sufficient to activate, for example, the three fiber laser devices 50c, 50f, and 50g. In a case where the fiber laser devices 50c, 50f, and 50g are activated, laser light enters each of the FMFs 123, 126, and 127. Output light, having a low beam quality, is therefore outputted to the laser head 60, via the exit fiber 13.

As described above, the fiber laser system 1 can control a beam quality of outgoing light.

Note that the number of fiber laser devices to be activated at a time is not limited to one or three as has been discussed. The number of such fiber laser devices can be selected as appropriate so that output light can be obtained which has a preferable beam quality and a preferable intensity.

(Fiber Laser System 1A)

As is illustrated in (b) of FIG. 6, the fiber laser system 1A (i.e., a laser system recited in the claims) can be obtained, by replacing the combiner 10 of the fiber laser system 1 with the converter 10B (see (a) of FIG. 5). It follows that the converter 10B includes a single FMF 121. This means that the fiber laser system 1A includes a single fiber laser device 50a.

The fiber laser system 1A can obtain outgoing light having a preferable beam quality, by appropriately selecting a region in which the FMF 121 is coupled to an entrance end surface 11a. The fiber laser system 1A can therefore realize an optical device which can control a beam quality of outgoing light, with use of a simpler configuration than the fiber laser system 1.

Embodiment 3

The following description will discuss, with reference to FIG. 7, a method of producing a combiner in accordance with Embodiment 3 of the present invention. The following description will discuss Embodiment 3 by taking, as an example, a combiner 10 in accordance with Embodiment 1. (a) of FIG. 7 is a flowchart depicting a method of producing the combiner 10, more specifically a method of producing a reduced diameter part 11 of the combiner 10. (b) of FIG. 7 is a plan view schematically illustrating a stretching step of the method (see (a) of FIG. 7) in which the reduced diameter part 11 is produced. Note that, in (b) of FIG. 7, (i) a two-dot chain line indicates a state in which a stretching step S10 has not been carried out and (ii) a solid line indicates a state in which the stretching step S10 has been carried out.

As is illustrated in (a) of FIG. 7, the method of producing the reduced diameter part 11 includes the stretching step S10 and a cut-out step S12. The production method in accordance with Embodiment 3 employs, as a material for producing the reduced diameter part 11, an optical rod 20 made of, for example, quartz glass.

Before the stretching step S10 is carried out, the optical rod 20 is set in a device for producing a reduced diameter part. In so doing, end parts 20a and 20b of the optical rod 20 are held by parts 60a and 60b of the production device, respectively. In this state, a central axis C5 of one end part 20a of the optical rod 20 matches a central axis C6 of the other end part 20b of the optical rod 20 (see (b) of FIG. 7).

In the stretching step S10, the optical rod 20 is stretched. In Embodiment 3, a melt-stretching method is employed to stretch the optical rod 20. In the stretching step S10, a deviation of the central axis C5 from the central axis C6 is increased while the optical rod 20 is being stretched. Specifically, the end part 20b of the optical rod 20 is pulled upward with respect to the end part 20a while the end part

20b is being stretched so as to be away from the end part 20a (see an arrow A10 shown in (b) of FIG. 7).

The stretching step S10 causes the optical rod 20 to have a stretched part having a diameter which (1) gradually decreases, (2) becomes a local minimal value, and then (3) gradually increases, as a distance from the end part 20a becomes closer to the end part 20b.

In the cut-out step S12, (i) a part, whose both ends have respective different girths, is selected from the optical rod 20 which has been stretched in the stretching step S10 and (ii) such a part is cut out as a reduced diameter part 11. By cutting the optical rod 20 at locations indicated by respective lines B-B' and C-C', it is possible to obtain an optical member whose one end part is wider in area than the other end part (see (b) of FIG. 7). Specifically, it is possible to obtain an optical member whose shape is a circular truncated cone of which central axis is inclined with respect to normal lines of respective basal planes.

By optically polishing both end surfaces of such an optical member whose shape is a circular truncated cone, it is possible to obtain a reduced diameter part 11 having (i) an entrance end surface 11a and (ii) an exit end surface 11b which is narrower in area than the entrance end surface 11a.

The production method in accordance with Embodiment 3 makes it possible to produce a combiner 10 which has been discussed in Embodiment 1.

[Recap]

In order to attain the above object, an optical device in accordance with an aspect of the present invention includes: (1) an entrance fiber bundle which is made up of at least one entrance fiber; (2) an exit fiber; and (3) a reduced diameter part having (i) an entrance end surface to which the entrance fiber bundle is coupled and (ii) an exit end surface to which the exit fiber is coupled, the exit end surface being narrower in area than the entrance end surface, a center of the exit end surface deviating from a center of the entrance end surface, in a case where the entrance end surface is viewed from a normal direction of the entrance end surface.

The reduced diameter part thus configured allows incoming light to be guided to the exit end surface without significantly reducing a beam quality of the incoming light, which incoming light has been coupled to a region, of the entrance end surface, which slightly deviates from the center of the exit end surface. The reduced diameter part also allows light to be guided to the exit end surface while significantly reducing a beam quality of the light, which light has been coupled to a region, of the entrance end surface, which greatly deviates from the center of the exit end surface. As such, the reduced diameter part allows outgoing light to be coupled to the exit fiber, which outgoing light has a beam quality which varies depending on a deviation of a region, in which incoming light has been coupled to the entrance end surface, from the center of the exit end surface.

The above configuration therefore makes it possible to control, by appropriately select a region in which incoming light is coupled to the entrance end surface, a beam quality of outgoing light which exits the optical device.

The optical device in accordance with an aspect of the present invention is preferably configured such that the following inequality (1) is satisfied:

$$D\text{in}/10 \leq D\text{off}(D\text{in}-D\text{out})/2 \quad (1)$$

where: Doff indicates a distance between the center of the entrance end surface and the center of the exit end surface; Din indicates a maximum width of the entrance end surface; and Dout indicates a maximum width of the exit end surface, each of Doff, Din, and Dout being obtained in a case where the entrance end surface of the reduced diameter part is viewed from the normal direction of the entrance end surface.

The above configuration makes it possible to broaden a range within which a beam quality of outgoing light, which exits the reduced diameter part, can be controlled.

The optical device in accordance with an aspect of the present invention is preferably configured to further include a GI fiber, which corresponds to the at least one entrance fiber, provided between the at least one entrance fiber and the entrance end surface of the reduced diameter part, the at least one entrance fiber being coupled to the entrance end surface, via the GI fiber.

The above configuration makes it possible to cause light, whose divergence angle is restrained, to be coupled to the entrance end surface of the reduced diameter part. This allows an enhancement of coupling efficiency between the reduced diameter part and the exit fiber, and ultimately makes it possible to restrain an optical loss in the optical device.

Since collimate light is coupled to the entrance end surface, it is possible to reduce the number of times by which light is reflected by a side surface of the reduced diameter part while being guided through the reduced diameter part. It is therefore possible to further increase a maximum beam quality of outgoing light which exits the reduced diameter part. This ultimately makes it possible to further broaden the range within which a beam quality of outgoing light, which exits the reduced diameter part, can be controlled.

The optical device in accordance with an aspect of the present invention is preferably configured such that the entrance end surface of and the exit end surface of the reduced diameter part each have a round shape.

The above configuration makes it possible to produce the reduced diameter part by stretching an existing columnar optical member such as an optical rod. It is thus possible to produce the reduced diameter part with use of an easily-available optical member. This allows a reduction in cost for realizing the optical device.

The optical device in accordance with an aspect of the present invention is preferably configured such that the entrance fiber bundle is made up of a plurality of entrance fibers.

With the above configuration, each of the plurality of entrance fibers is coupled to a corresponding region of the entrance end surface of the reduced diameter part. This allows light, which has entered an entrance fiber coupled to a region, of the reduced diameter part, which slightly deviates from the exit end surface, to exit the exit end surface as light having a high beam quality. This also allows light, which has entered an entrance fiber coupled to a region, of the reduced diameter part, which greatly deviates from the exit end surface, to exit the exit end surface as light having a low beam quality. It is therefore possible to obtain outgoing light having a preferable beam quality, by appropriately selecting any of the plurality of entrance fibers. In so doing, one or more of the plurality of entrance fibers can be selected.

The optical device is preferably configured such that the entrance fiber bundle is made up of a single entrance fiber; and a region, in which the single entrance fiber is coupled to the entrance end surface of the reduced diameter part, is variable.

The above configuration makes it possible to obtain outgoing light having a preferable beam quality, by appropriately selecting a region in which the single entrance fiber is coupled to the entrance end surface. It is therefore possible to realize, with use of a simple configuration, an optical device which can control a beam quality of outgoing light.

In order to attain the above object, a laser system in accordance with an aspect of the present invention includes: an optical device including (1) an entrance fiber bundle which is made up of a plurality of entrance fibers, (2) an exit fiber, and (3) a reduced diameter part having (i) an entrance end surface to which the entrance fiber bundle is coupled and (ii) an exit end surface to which the exit fiber is coupled, the exit end surface being narrower in area than the entrance end surface, a center of the exit end surface deviating from a center of the entrance end surface, in a case where the entrance end surface is viewed from a normal direction of the entrance end surface; and a plurality of laser devices each of which includes an exit fiber connected to a corresponding one of the plurality of entrance fibers of the optical device.

The above configuration makes it possible to obtain outgoing light having a preferable beam quality, by (i) appropriately selecting any of the plurality of entrance fibers and (ii) activating a laser device(s) connected to an entrance fiber(s) thus selected. It is therefore possible to control a beam quality of outgoing light which exits the laser system.

In order to attain the above object, a laser system in accordance with an aspect of the present invention includes: an optical device including (1) an entrance fiber bundle which is made up of a single entrance fiber, (2) an exit fiber, and (3) a reduced diameter part having (i) an entrance end surface to which the entrance fiber bundle is coupled and (ii) an exit end surface to which the exit fiber is coupled, the exit end surface being narrower in area than the entrance end surface, a center of the exit end surface deviating from a center of the entrance end surface, in a case where the entrance end surface is viewed from a normal direction of the entrance end surface; and a single laser device including an exit fiber which is connected to the single entrance fiber of the optical device, a region, in which the single entrance fiber is coupled to the entrance end surface of the reduced diameter part, being variable.

The above configuration makes it possible to obtain outgoing light having a preferable beam quality, by appropriately selecting a region in which the single entrance fiber, which constitutes the entrance fiber bundle, is coupled to the entrance end surface of the reduced diameter part. It is therefore possible to control a beam quality of outgoing light emitted from the laser system.

In order to attain the above object, a method of producing an optical device in accordance with an aspect of the present invention is a method of producing an optical device including (1) an entrance fiber bundle which is made up of at least one entrance fiber, (2) an exit fiber, and (3) a reduced diameter part having (i) an entrance end surface to which the entrance fiber bundle is coupled and (ii) an exit end surface to which the exit fiber is coupled, the exit end surface being narrower in area than the entrance end surface, the method including the steps of: (a) increasing a deviation of a central axis of one end part of an optical rod from a central axis of the other end part of the optical rod while stretching the optical rod; and (b) cutting out a part of the optical rod which has been stretched in the step (a), the part of the optical rod having both ends which have respective different girths and serving as the reduced diameter part.

The above production method makes it possible to produce a reduced diameter part having an entrance end surface and an exit end surface. A center of the exit end surface deviates from a center of the entrance end surface, in a case where the entrance end surface is viewed from a normal direction of the entrance end surface. It is therefore possible to produce an optical device which can control a beam quality of outgoing light.

[Supplemental Note]

The present invention is not limited to the foregoing embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST 1, 1A: Fiber laser system (laser system)
10, 10A, 10C: Combiner (optical device)
10B: Converter (optical device)
11, 11C: Reduced diameter part
11a, 11Ca: Entrance end surface
11b, 11Cb: Exit end surface
12, 12A: Entrance fiber bundle
12Aa: End part
121 through 127: Few mode fiber (entrance fiber)
121a through 127a: Core
121b through 127b: Cladding
121g through 127g: GI fiber
13: Exit fiber
13a: Core
13b: Cladding
50a through 50g: Fiber laser device
53a through 53g: Exit fiber
LD1 through LD10: Laser diode
C1 through C4: Center
C5, C6: Central axis
20: Optical rod
20a, 20b: End part
60a, 60b: Holding part

The invention claimed is:

1. An optical device, comprising:
   an entrance fiber bundle which is made up of at least one entrance fiber;
   an exit fiber; and
   a reduced diameter part having (i) an entrance end surface to which the entrance fiber bundle is coupled and (ii) an exit end surface to which the exit fiber is coupled, the exit end surface being narrower in area than the entrance end surface,
   a center point of an outer edge of the exit end surface deviating from a center point of an outer edge of the entrance end surface, in a case where the entrance end surface is viewed from a normal direction of the entrance end surface.

2. The optical device as set forth in claim 1, wherein:
   the entrance end surface of and the exit end surface of the reduced diameter part each have a round shape.

3. The optical device as set forth in claim 1, wherein:
   a region, in which the at least one entrance fiber is coupled to the entrance end surface of the reduced diameter part, is variable.

* * * * *